(12) United States Patent
Klemic et al.

(10) Patent No.: US 7,781,747 B1
(45) Date of Patent: Aug. 24, 2010

(54) VERY THIN DOSIMETER FILTERS AND LOW PROFILE DOSIMETER ENCORPORATING THE SAME

(75) Inventors: Gladys Klemic, Naperville, IL (US);
Paul Bailey, Washington, DC (US);
Cecilia Breheny, Mount Vernon, NY (US)

(73) Assignee: Dept. of Homeland Security, Washington, DC (US)

( * ) Notice: Subject to any disclaimer, the term of this patent is extended or adjusted under 35 U.S.C. 154(b) by 0 days.

(21) Appl. No.: 12/201,341

(22) Filed: Aug. 29, 2008

Related U.S. Application Data

(63) Continuation-in-part of application No. 11/288,058, filed on Nov. 18, 2005, now Pat. No. 7,420,187.

(60) Provisional application No. 60/696,295, filed on Jul. 1, 2005.

(51) Int. Cl.
*H05B 33/00* (2006.01)

(52) U.S. Cl. ............. 250/484.5; 250/484.4; 250/483.1; 250/482.1

(58) Field of Classification Search ............. 250/484.5, 250/484.4, 483.1, 482.1
See application file for complete search history.

(56) References Cited

U.S. PATENT DOCUMENTS

| | | | | |
|---|---|---|---|---|
| 3,789,227 | A * | 1/1974 | Eichner et al. | 250/484.3 |
| 5,065,031 | A * | 11/1991 | Moscovitch | 250/486.1 |
| 5,696,381 | A * | 12/1997 | Quintern | 250/472.1 |
| 6,316,782 | B1 * | 11/2001 | Akselrod et al. | 250/582 |
| 2005/0023485 | A1 * | 2/2005 | Koninckx | 250/484.4 |

* cited by examiner

*Primary Examiner*—David P Porta
*Assistant Examiner*—Jessica L Eley
(74) *Attorney, Agent, or Firm*—Dept. of Homeland Security; Lavanya Ratnam

(57) ABSTRACT

The present invention relates to a novel dosimeter filter and a dosimeter incorporating the same. More specifically, one embodiment of the invention relates to a very thin dosimetry device generally comprising: an optically stimulated luminescent material OSLM (i.e. aluminum oxide) sandwiched between at least two novel CEEC filters, wherein each CEEC filter comprises two layers of filtering material: an electronic equilibrium filter layer and an energy compensation filter layer wherein the electronic equilibrium filters comprise steel and wherein the energy compensation filters comprise Tantalum.

18 Claims, 10 Drawing Sheets

VERY THIN DOSIMETER FILTERS AND LOW PROFILE DOSIMETER ENCORPORATING THE SAME

RELATION TO OTHER PATENT APPLICATIONS

The present application is a Continuation-in-part of U.S. Non-Provisional patent application Ser. No. 11/288,058 filed on Nov. 18, 2005, now U.S. Pat. No. 7,420,187 which claims priority to U.S. Provisional Patent Application No. 60/696,295 filed on Jul. 1, 2005, by instant inventors, both of which are hereby incorporated by reference in their entireties.

GOVERNMENT RIGHTS IN THE INVENTION

The United States Government has rights in this invention pursuant to the employer-employee relationship of the Government to the inventors as U.S. Department of Homeland Security Employees.

FIELD OF INVENTION

The present invention relates to a very thin dosimeter filter and a dosimeter incorporating the same. More specifically, one or more of the embodiments relate to a very thin combined equilibrium and energy compensation filter (CEEC filter), and a dosimeter incorporating such an invented CEEC filter. One or more embodiments of the invention also relate to a readout and recordation system for monitoring radiation exposure using the invented dosimeter.

BACKGROUND OF THE INVENTION

Several radiation measurement technologies currently exist including Themoluminescent (TLD) dosimeters, Optically Stimulated Luminescence (OSL) dosimeters, electronic dosimeters, and quartz or carbon fiber electrets.

Optically Stimulated Luminescence (OSL) dosimeters use an optically stimulated luminescent material (OSLM) (i.e. carbon doped aluminum oxide) to retain radiation energy. Tiny crystal traps within the OSL material trap and store energy from radiation exposure. The amount of radiation exposure is determined by shining a light of one color (i.e. green) on the crystal traps and measuring the amount of light of another color (i.e. blue) emitted. Alternatively, pulsed light stimulation can be used to differentiate between the stimulation and emission light [there is a patent for this, held by Stephen McKeever, See, U.S. Pat. Nos. 5,892,234 and 5,962,857, issued to McKeever et al. Unlike TLD, OSL systems provide readouts in only a few seconds and provide multiple readouts since only a very small fraction of the exposure signal is depleted when read out. In current dosimetry programs based on OSL and TLD dosimeters, the dosimeters are returned to a processing laboratory for readout.

One of the problems with state of the art OSL systems is that the filters used within the dosimeters are too thick for use in a thin, credit card sized dosimeter. For more information on OSL materials and systems, see, U.S. Pat. No. 5,731,590 issued to Miller; U.S. Pat. No. 6,846,434 issued to Akselrod; U.S. Pat. No. 6,198,108 issued to Schwietzer et al.; U.S. Pat. No. 6,127,685 issued to Yoder et al.; U.S. patent application Ser. No. 10/768,094 filed by Akselrod et al.; all of which are hereby incorporated by reference in their entireties. See also, *Optically Stimulated Luminescence Dosimetry*, Lars Botter-Jensen et al., Elesevier, 2003; Klemic, G., Bailey, P., Miller, K., Monetti, M. External radiation dosimetry in the aftermath of radiological terrorist event, Rad. Prot. Dosim, in press; Akslerod, M. S., Kortov, V. S., and Gorelova, E. A., *Preparation and properties of $Al_2O_3$:C.* Radiat. Prot Dosim 47, 159-164 (1993); and Akselrod, M. S., Lucas, A. C., Polf, J. C., McKeever, S. W. S. *Optically stimulated luminescence of $Al_2O_3$:C.* Radiation Measurements, 29, (3-4), 391-399 (1998), all of which are incorporated by reference in their entireties.

A need exists for a very thin combined equilibrium and energy compensation filter for OSLM dosimeters and dosimeter incorporating such filters.

SUMMARY OF THE INVENTION

One embodiment of the present invention relates to a dosimeter and a related radiation exposure system for measuring and recording radiation exposure. The invention is a result of the Environmental Measurements Laboratory's (EML) "Citizen's Dosimeter" project for developing a small profile dosimeter.

One embodiment of the invented dosimeter takes advantage of the thin format and homogenous sensitivity of powdered, laminated $Al_2O_3$:C (which is the basis of commercially used OSL personal dosimetry systems), combined with a novel set of very thin filters to allow the aluminum oxide to be used in a very thin format.

An optional shutter (or similar) mechanism in the system allows optical readout and reuse of the dosimeter, thereby combining integrating dose of record with an option for user readout. Readers could be linked to a central database. Alternatively, badges could be returned to a central processing center for readout wherein the filters are removed so that the OSL material can be read.

In one embodiment of the invention, the dosimeter generally comprises: an optically stimulated luminescent material (OSLM) (i.e. $Al_2O_3$:C), positioned within an encased structure (i.e. card), as to be protected by filtering materials when worn by the wearer, but which can be exposed (clear of filters on at least one side) for readout.

In one embodiment, during use by the wearer, the OSLM 1 (i.e. carbon doped aluminum oxide) is sandwiched between two CEEC filters on both sides of the OSLM 1, as shown in FIG. 1, each CEEC filter 5 comprising at least two layers of filtering material: an electronic equilibrium filter 2 (2') and an energy compensation filter 3 (3').

The invented dosimeter system would be useful for both worker and citizen use.

BRIEF DESCRIPTION OF THE DRAWINGS

For the purpose of facilitating an understanding of the invention, it is illustrated in the accompanying drawings.

DETAILED DESCRIPTION OF THE INVENTION

One embodiment of the invented dosimeter generally comprises: an optically stimulated luminescent material (OSLM) (i.e. $Al_2O_3$:C), positioned within an encasing (i.e. credit-card structure), as to be protected by filtering materials when worn by the wearer, but which can be exposed (clear of filters on at least one side) for readout.

Figure 1A:
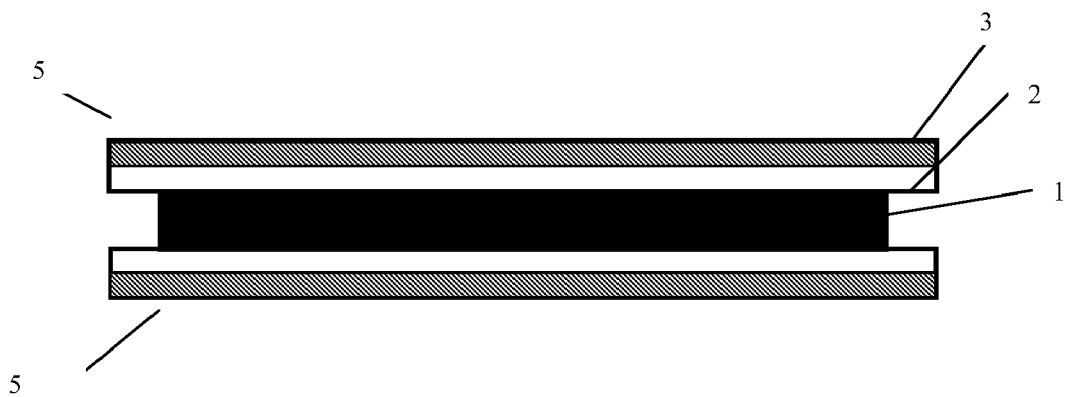
FIG. 1A—is a schematic illustration of an OSLM 1, sandwiched between two Combined Equilibrium and Energy Compensation (CEEC) filters 5, each CEEC filter being comprised of: and equilibrium filter layer 2 and a energy compensation filter layer 3.

In one preferred embodiment, during use by the wearer, the OSLM 1 (i.e. aluminum oxide) is sandwiched between at least two CEEC filters, on both sides of the OSLM 1, as shown in FIG. 1A, wherein each CEEC filter comprises two layers of filtering material: an electronic equilibrium filter layer 2 and an energy compensation filter layer 3.

Figure 1B:
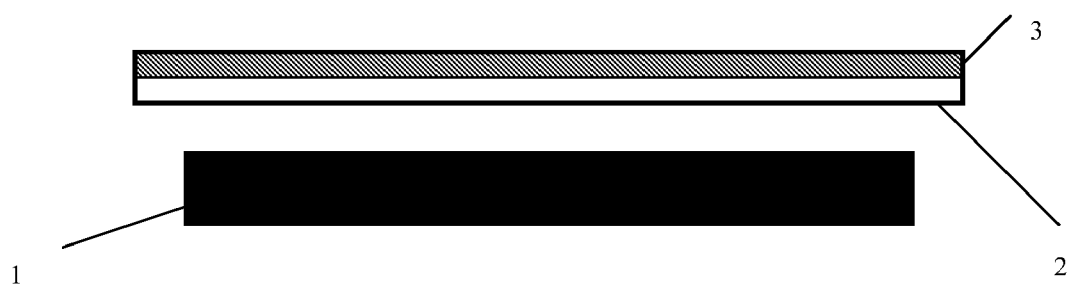
FIG. 1B—is a schematic illustration of a Combined Equilibrium and Energy Compensation (CEEC) filter 5, the CEEC filter being comprised of: and equilibrium filter layer 2 and a energy compensation filter layer 3, wherein the CEEC acts as a filter for an OSLM.
Figure 1C:
FIG. 1C—is a schematic illustration of an OSLM 1, surrounded by a Combined Equilibrium and Energy Compensation (CEEC) filter comprised of: and equilibrium filter layer 2 and a energy compensation filter layer 3.
Figure 2:
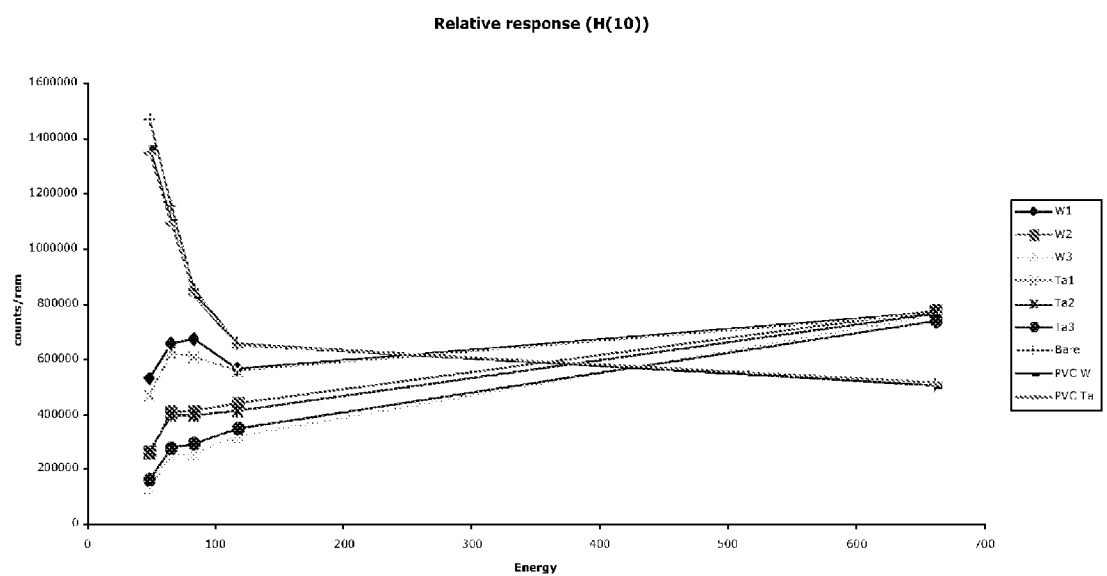
FIG. 2—Graph of energy v. relative response for OSLM combined with various filter materials as well as bare OSLM.
Figure 3:
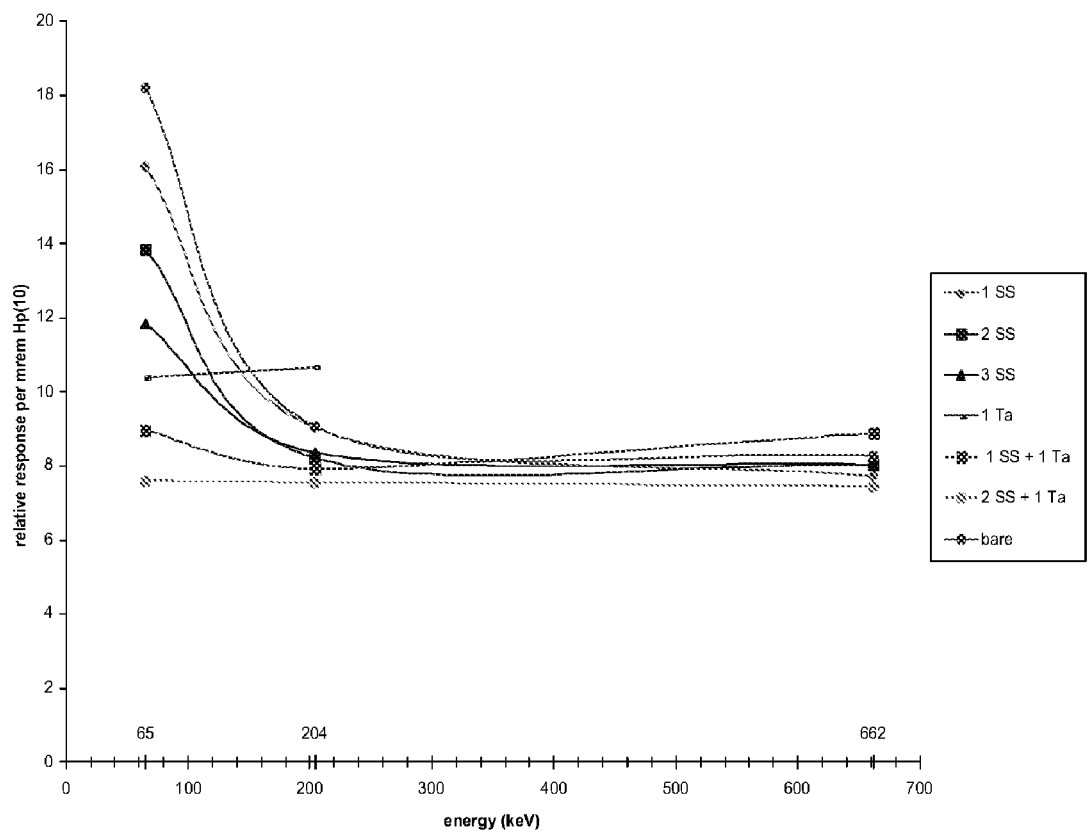
FIG. 3—Graph of energy v. relative response per mrem $H_p(10)$ for OSLM with various filter materials FIG. 4—Graph of energy v. counts/$H_p(10)$ at 0 degrees for various combinations of tantalum and stainless steel.

It should be noted the position/location of the filter layers is important. The electronic equilibrium filters 2 should be located between the energy compensation filters 3 and the OSLM 1 as illustrated in FIG. 1. The size of the filters should be at least as large in surface area as the OSLM 1. It may be preferable to use filters having surfaces larger that the OSLM 1, so as to filter angularly incident radiation. One suitable range of sizes is between about 1-2 times the size of the OSLM, although larger filters could be employed.

In one embodiment the OSLM is positioned within an encasing and between two sheets of filter materials during times of radiation exposure, wherein a shutter mechanism moves the OSLM (or filters) revealing at least one side of the OSL material to allow readout of the doped aluminum oxide by an OSL reader. For more details see, U.S. patent application Ser. No. 11/288,058 filed which is hereby incorporated by reference in its entirety.

Optical Stimulated Luminescent Material OSLM

The current state of the art Optical Stimulated Luminescent Material (OSLM's) is a specialized carbon-doped aluminum oxide material manufactured by Landauer, Inc. (Glenwood, Ill.), marketed in dosimeters with trade names LUXEL and INLIGHT. The OSLM consists of specially formulated, proprietary, powderized $Al_2O_3$:C deposited on a sheet. This makes it possible to have a large batch with homogeneous sensitivity. Alternatively, one can deposit the aluminum oxide directly upon a surface with a glue binder.

Exposure of the OSLM to ionizing radiation releases electrons which are trapped in defects in the material's crystal structure. The electrons are released from the traps when stimulated with 520 nm wavelength light (i.e. green). As they return to the ground state, 420 nm wavelength light (i.e blue) is emitted. It should be noted that other light wavelengths could be employed, as could a pulsed stimulation system.

The OSLM empties only a fraction of the traps so that the material can be read out repeatedly while still continuing to absorb dose. Bar codes, micro-chips or other storage means can store sensitivity (and other) information on the card so that dosimeters can be read out on cross-calibrated readers.

Current commercial OSL aluminum oxide is available in thin sheets (approx. 0.3 mm), although the thickness of the OLSM can be varied. One suitable thickness range is between about 0.1-1 mm, preferably between about 0.2-0.6 mm. Thinner and thicker forms may be employed in certain situations.

Figure 4:
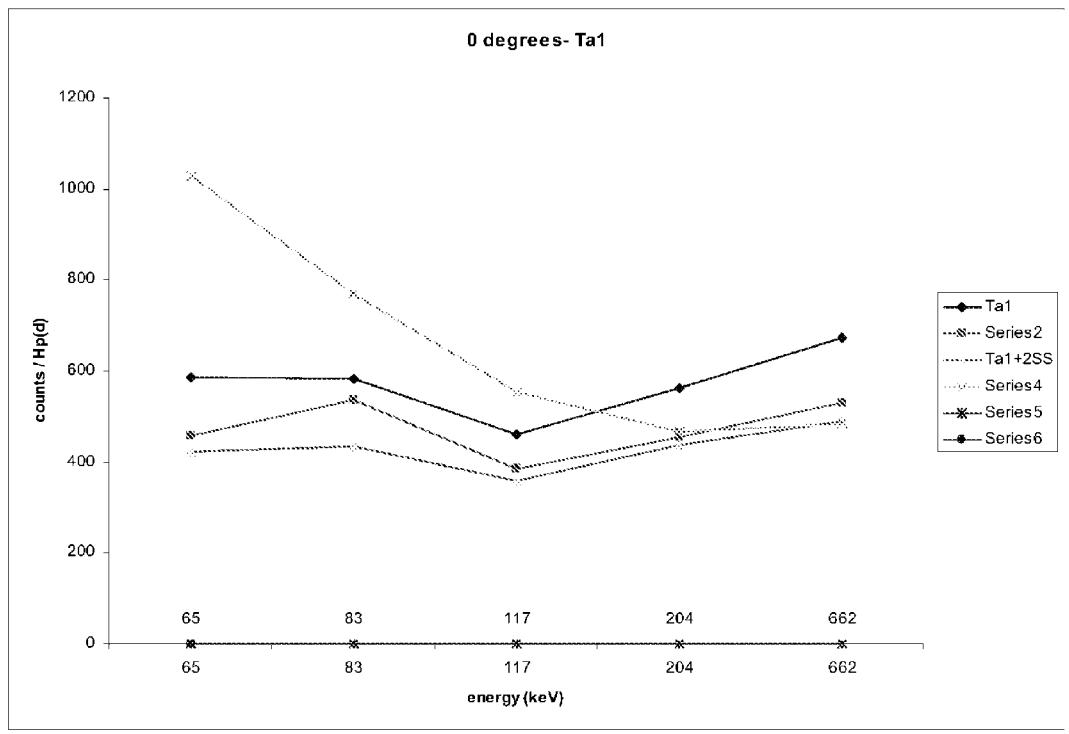
Figure 5:
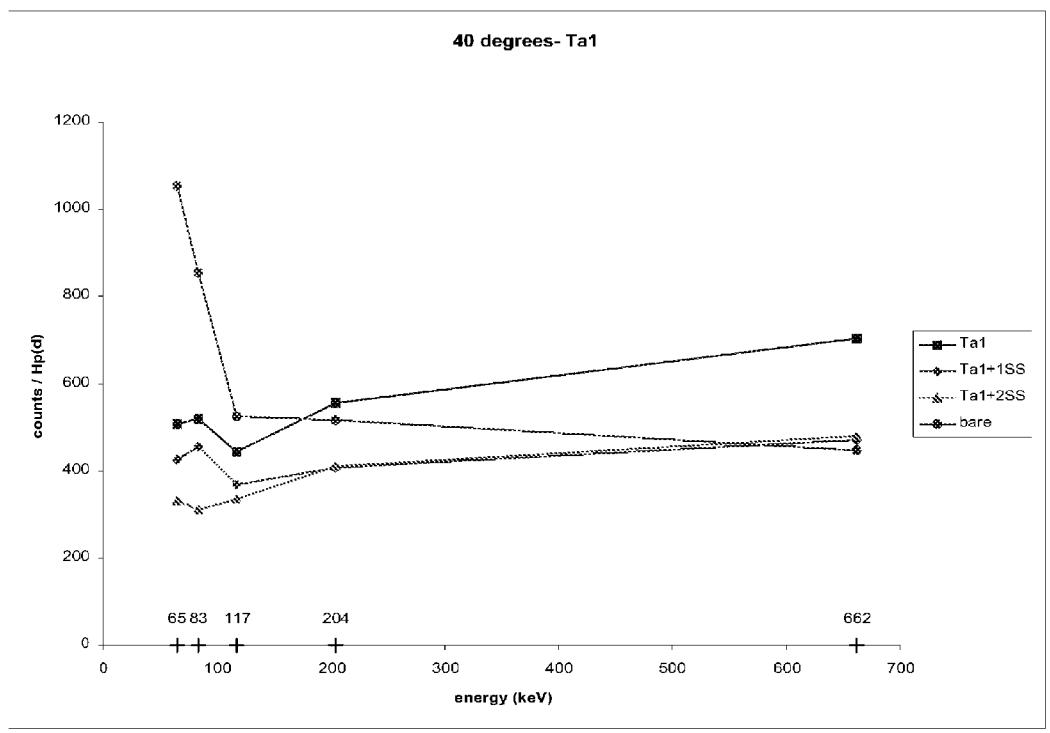
FIG. 5—Graph of energy v. counts/$H_p(10)$ at 40 degrees for various tantalum-stainless steel filter combinations.
Figure 6:
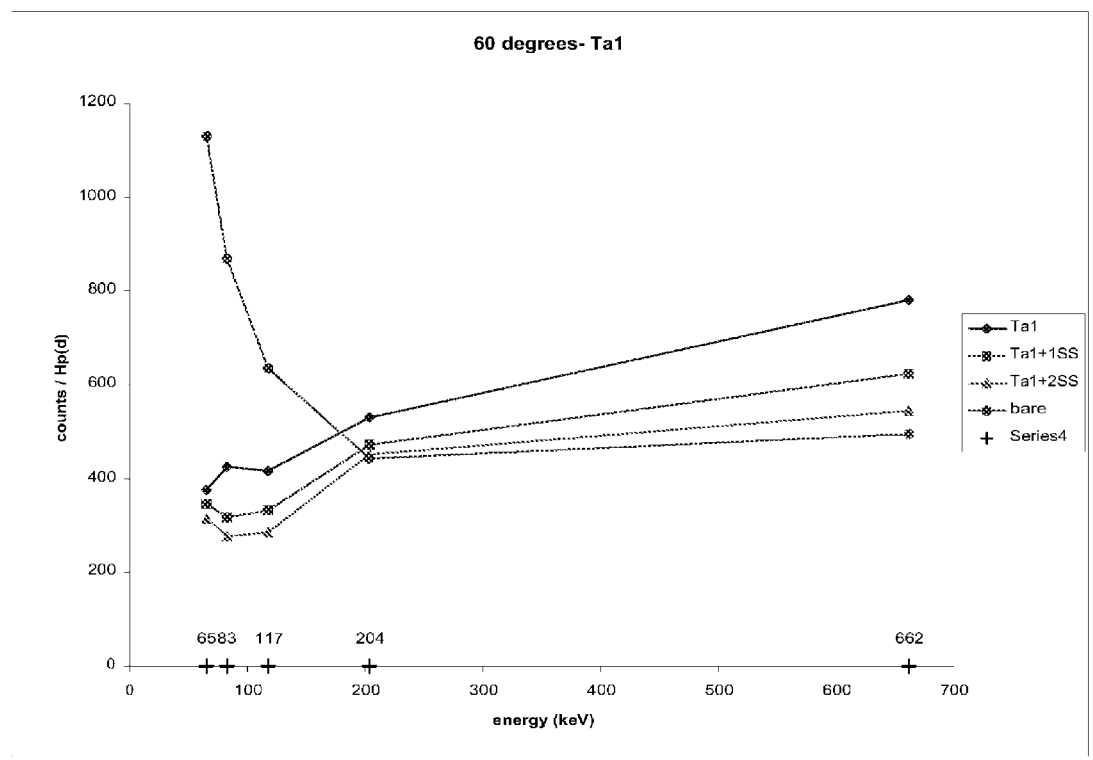
FIG. 6—Graph of energy v. counts/$H_p(10)$ at 60 degrees for tantalum-stainless steel filter combinations.
Figure 7:
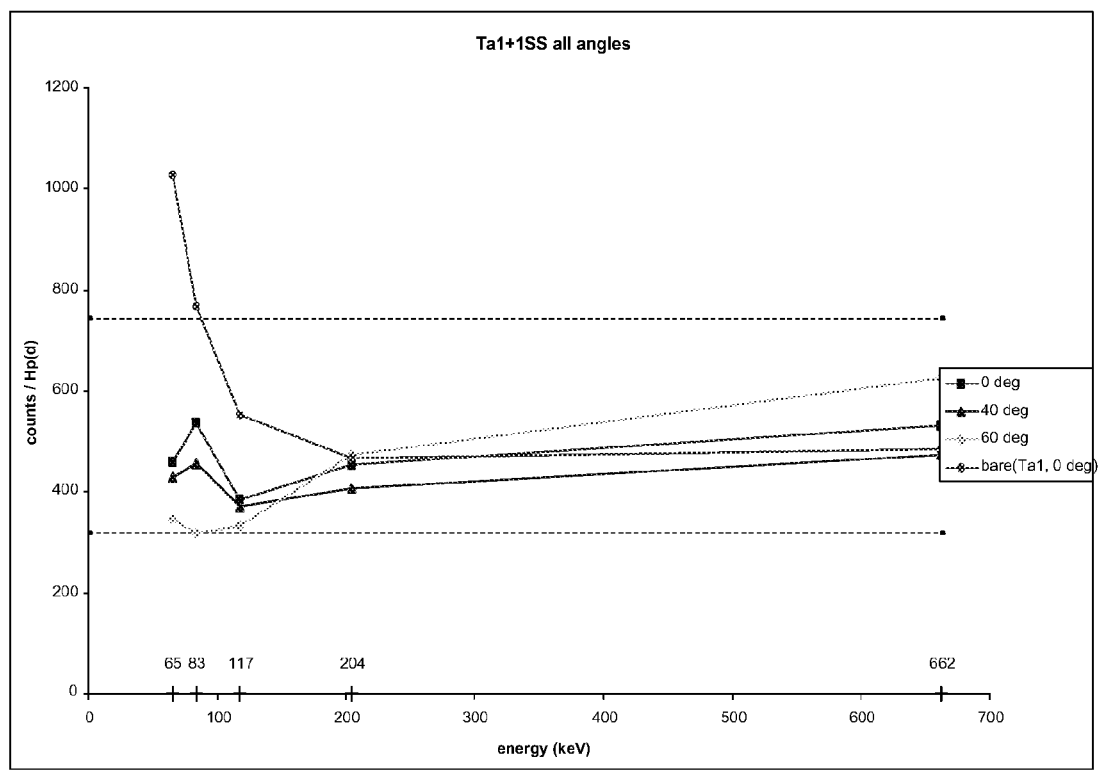
FIG. 7—Graph of energy v. counts/$H_p(10)$ at various incident radiation angles for OSLM sandwiched with one layer each of tantalum and stainless steel and compared to bare OSLM at 0 degrees
Figure 8:
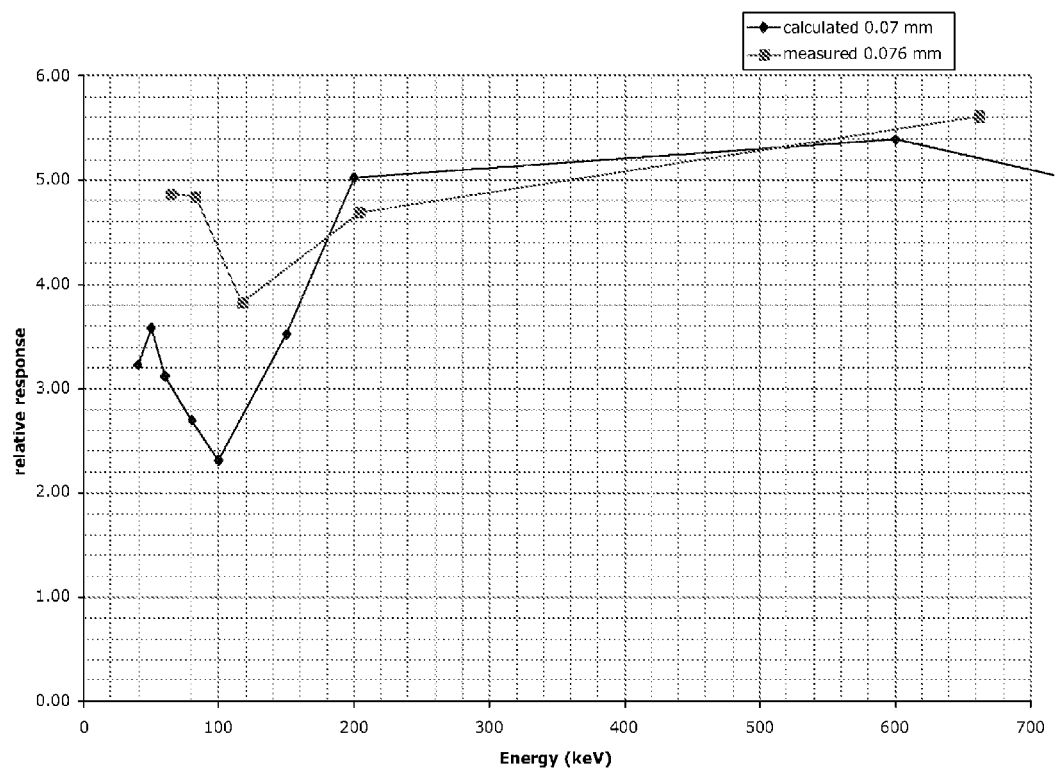
FIG. 8 shows the results of MCNP calculations as expressed in energy v. relative response.

OSL materials require filters for energy compensation and electronic equilibrium as well as light-tight packaging. Energy compensation is needed because carbon doped aluminum oxide material does not have a flat response over the range of gamma energies that are relevant for personal dosimetry. In particular, its personal dose equivalent response to 50 keV photons is about 3 times greater than that to 662 keV, as shown in FIG. 4.

Previous dosimeters have corrected this energy compensation with various filters. However, prior art filter materials require thickness too large for use in a credit card sized dosimeter.

For example, a Landauer "Luxel" badge uses a sandwich of 1 mm of plastic and 0.7 mm copper; the OSLM is 0.3 mm thick, for a total thickness of 3.7 mm, plus additional packaging. A credit card is approximately 0.5-1.5 mm thick.

It should be noted that while doped aluminum oxide is preferred it may be possible to use other OSL material or other dosimetry materials, although it is clear that OSLMs have several advantages as described herein. See, U.S. Pat. No. 6,846,434 issued to Akselrod, which is hereby incorporated by reference in its entirety.

Novel CEEC Filter

As noted earlier, doped aluminum oxide requires energy compensation filters to produce a flat response over a range of gamma energies. Current dosimeters use copper with thicknesses too great for use in a very thin (i.e. credit-card sized dosimeter). Therefore, inventors had to discover a novel combination of filter materials capable of being incorporated into a credit-card form and thickness. This research resulted in the invented CEEC filter.

Inventors investigated a number of materials to find an energy compensation filter that would allow the use of less (thinner) material, and which was relatively inexpensive. Modeling tests were performed on a variety of materials including but not limited to: gold, lead, tungsten and tantalum and concluded that Tantalum (Ta) and Tungsten (W) were the most promising for flattening the low energy response. Tantalum was chosen after modeling (Monte Carlo calculations) experiments showed that W reduced the low energy response more than necessary, so research focused on tantalum. Also, Tantalum was less expensive (~$6 per square inch compared to ~$9 per square inch for W).

The radiation response of the OSL dosimeter material $Al_2O_3$:C varies with the incident photon energy: the response to 50 keV photons is a factor of 2.6 greater than that for 662 keV photons. It may seem that the use of tantalum as a filter to flatten the OSL response is obvious due to its high atomic number (Z), but in fact that is not the case. While a high Z filter material will indeed attenuate low energy photons, it may also have the undesirable effect of increasing the dosimeter response at higher energies. This is because incident higher energy photons may release electrons in the high Z material, giving them enough energy to produce an additional signal in the dosimeter material. Therefore not all high Z materials would be suitable; on the contrary they could cause additional complications. In fact, most commercial dosimeters make use of a lower Z metal such as copper for the low energy photon attenuation combined with a layer of plastic to absorb secondary electrons and restore electronic equilibrium.

One of the disadvantages of these current art technology energy compensation filters is that they require thicknesses that are too large for use in a very thin dosimeter.

The inventors investigated various materials as potential electronic equilibrium filters including PVC, high density polyethylene, and lower density metals such as aluminum, titanium, and stainless steel. Instead of plastic, the inventors discovered that a very thin sheet of steel, preferably stainless steel (SS) can act as the electronic equilibrium filter with excellent results.

The combination of stainless steel behind tantalum was found to give the best response. See, FIGS. 2-7. The numbers in the figures are shorthand for use in carrying out and documenting the experiments. The label "1 Ta" meant 0.076 mm Tantalum. The label "1 SS" meant ~0.076 mm stainless steel. The label "2 SS+1 Ta" meant two pieces of 0.076 mm stainless steel with 1 piece of 0.076 mm Tantalum.

FIG. 1A shows one illustrative example of the invented combined equilibrium and energy compensation (CEEC) filter. The illustrated CEEC comprises: a filter with an outer layer and an inner layer, wherein the outer layer comprises an energy compensation filter material and the inner layer comprises an electronic equilibrium filter material. During use in a dosimeter, the inner layer is adjacent to the OSL material as shown in FIG. 1B.

In alternate embodiment the two layer can be separated/attached by one or more intervening layers and/or adhesives but electronic equilibrium filter must be between the energy compensation filter and the OSLM.

Inventors use of Tantalum as a low energy filter combined with an additional metal, stainless steel, to achieve electronic equilibrium is unique, and was arrived at through extensive experimentation to achieve a minimum total thickness which is significantly less than that typically used in standard personal dosimeters. The discovery of these novel filtering materials allowed inventors to reach their goal of having a total thickness (aluminum oxide sandwiched between metals) to be close to that of a credit-card (i.e. approximately 0.5-1.5 mm), and an energy response sufficient to pass the American National Standards Institute (ANSI) standard for personal dosimetry accreditation (ANSI N13.11) which requires the low energy and 662 keV response to be within 30%. Typical OSLM is approx. 0.3 mm thick.

One embodiment of the invention that meets these requirements comprises: 0.076 mm tantalum+~0.076 mm stainless steel+0.3 mm OSLM+~0.076 mm stainless steel+~0.076 mm tantalum.

Although the above filters are a preferred embodiment, the thickness of the metal filters an OSLM (i.e. aluminum oxide) can be varied. For example, one suitable range of filter thicknesses is between about 0.03-0.15 mm each, preferably between 0.05-0.10 mm each. Thinner and thicker filters may be employed in certain situations.

It should be noted that the OSLM must be moved from behind at least one side of the filters to allow optical readout, so at least one side of the aluminum oxide must be capable of being exposed for read out purposes. Alternatively, at least one side of the filters could be moved to reveal the exposed OSLM.

Dosimeter

Figure 9:
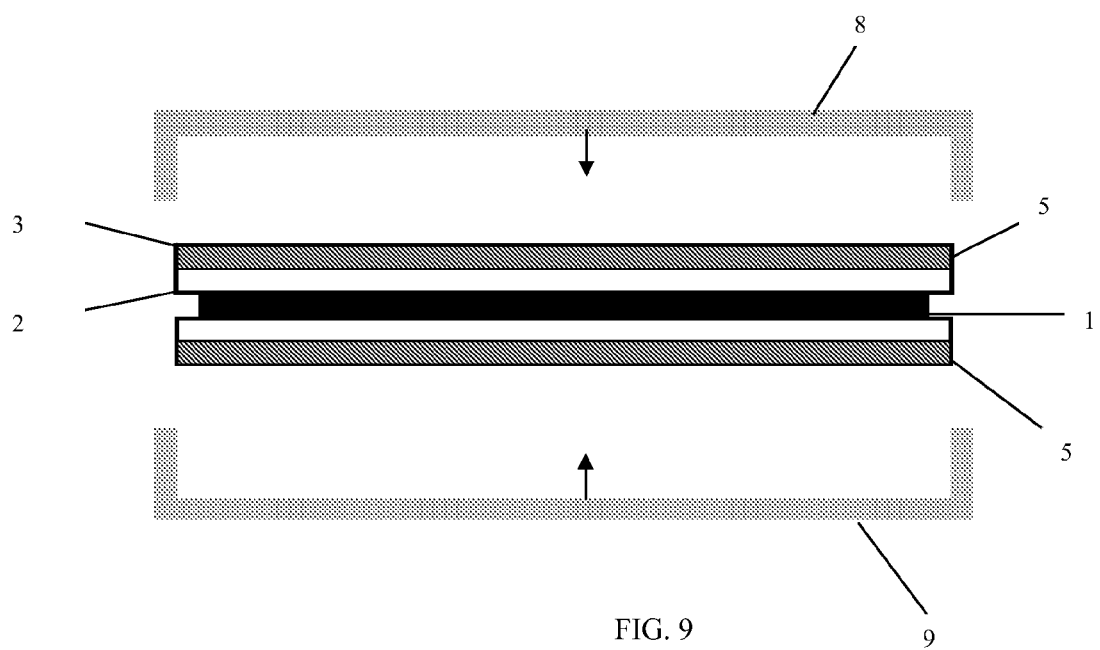
FIG. 9 is a schematic illustration of an OSLM 1, sandwiched between two Combined Equilibrium and Energy Compensation (CEEC) filters 5, each CEEC filter being comprised of: an equilibrium filter layer 2 and a energy compensation filter layer 3, wherein the components are encased between an upper encasing 8 and lower encasing 9.

In an illustrated embodiment shown in FIG. 9A, the OSLM 1 is sandwiched between suitable upper 8 and lower encasing members 9, and CEEC filters 5 are placed on either side of the OSLM in close proximity to the OSLM. Preferably the upper and lower encasing members are sealed together using adhesives, heat treatment, or other attachment or sealing means.

FIG. 9B shows an alternate embodiment wherein, the OSLM 1 is sandwiched between two CEEC filters 5 in close proximity to the OSLM, and wherein the filters and OSLM are enclosed within a rugged encasing 4.

Figure 10:
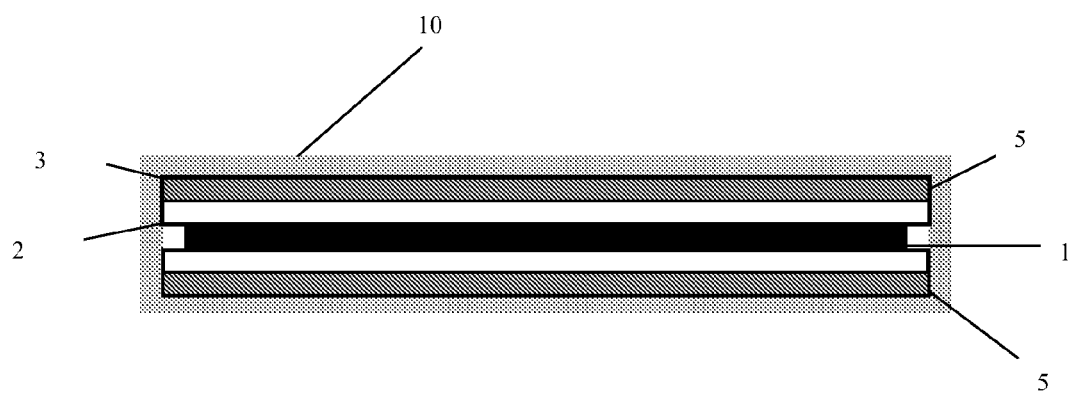
FIG. 10 is a schematic illustration of an OSLM 1, sandwiched between two Combined Equilibrium and Energy Compensation (CEEC) filters 5, each CEEC filter being comprised of: and equilibrium filter layer 2 and a energy compensation filter layer 3, wherein the components are enclosed within an encasing 10.

FIG. 10 show one embodiment wherein the OSLM 1 is sandwiched between two CEEC filters 5 in close proximity to the OSLM, and wherein the filters and OSLM are enclosed within an encasing 10.

Another preferred embodiment of invented dosimeter is also designed to be roughly the size and thickness of a credit card. As noted above, the novel thin filters were critical in allowing the creation of a very thin aluminum oxide based dosimeter. Also needed is a suitable card design. The card should allow the aluminum oxide to be covered by the filters during use and wherein the filters can be removed to allow readout and be the thickness of a credit card.

One suitable card design is a modification of a card manufactured by StorCard and has the size, shape, and flexibility of an ordinary credit card, but is made up of laminated layers of plastic and metal. The card contains a rotating data storage disk that is accessed on one side through a window and a shutter. Since the present application does not require the rotating disk, the rotating disk is eliminated, so that the dosimetry material and filters can fit into that cavity. Exemplary StorCard designs are found in U.S. Pat. No. 6,832,730 issued to Conner et al., and U.S. Patent Application Nos. 2003/0218064, 2003/0024995, and 2004/0135241 filed by Conner et al., all which are hereby incorporated by reference in their entireties. The thicknesses, material and other aspects of the various layers, and the sizes and shapes of some of the cut-outs can be modified. It should be noted that a number of other card designs could be employed as long they incorporated the filters as explained herein, protected the OSLM from light when worn by the user, and provided some shutter or similar means to allow easy, multiple readouts of the OSLM material.

In one embodiment, the OSLM is inserted into an existing hole on the movable shutter of the StorCard. When the shutter opens it drags the OSLM over the opening in the card, making it accessible for readout. When the shutter is closed, the OSLM would be dragged into the interior of the card where it would be positioned behind the filters and protected from light. Alternatively, the shutter could be made of filter materials and actuated away to expose fixed OSL material.

Numerous alternative card embodiments and shutter means can be envisioned that allow the aluminum oxide to be covered by the filters during use and wherein the filters can be removed to allow readout. For example the OSLM and filters can be encased within a thin plastic laminate, card structure, badge etc. See, U.S. Pat. No. 5,731,590 issued to Miller; U.S. Pat. No. 6,846,434 issued to Akselrod; U.S. Pat. No. 6,198,108 issued to Schwietzer et al.; U.S. Pat. No. 6,127,685 issued to Yoder et al.; U.S. patent application Ser. No. 10/768,094 filed by Akselrod et al.; all of which are hereby incorporated by reference in their entireties.

The dosimeter card can contain an integrated electronic chip that controls the flow of data to and from the card. The chip can be used for updating of information about the card, reader, and dose information. Other storage means could also be used including magnetic strip or other data storage technology.

The citizen dosimeter could serve a dual purpose as identity card, the outer layer can be covered/encased with a thin plastic layer liked PVC which can be decorated with photo ID, information and/or artwork, and can include a hole for wearing the card on a lanyard, or badge holder. See, U.S. Pat. No. 6,832,730 issued to Conner et al.; U.S. patent application Ser. No. 10/194,132 filed by Conner et al.; U.S. patent application Ser. No. 10/384,385 filed by Conner et al.; and U.S. patent application Ser. No. 10/716,267 filed by Conner et al., all of which are hereby incorporated by reference in their entireties.

Landauer presents their OSL material in a number of different forms. In the "Luxel" dosimeter, it is powdered and laminated in polyester. Alternatively the powdered doped aluminum oxide material can be placed or laminated onto different materials if needed.

U.S. patent application Ser. No. 11/288,058 filed by the inventors, which is hereby incorporated by reference in its entirety describes several embodiments of the dosimeter card and its construction.

The dosimeter card can also incorporate smart chips, magnetic strips (not shown) or other information storage means. In one embodiment the dosimeter card can also be coated with a PVC plastic or other similar coating and the card can be personalized or otherwise modified for identification.

OSL Reader/Card Interface

The credit card dosimetry system generally comprising: a dosimeter card, a dosimeter card interface, and an OSL reader (not shown). The dosimeter card is inserted into the card interface which actuates the shutter mechanism within the card and exposes the OSLM. The OSL reader then reads the OSLM as discussed below.

OSL Reader

An exemplary OSL reader system is the InLight System manufactured by Landauer (and Panasonic).

Exposure of $Al_2O_3$:C to ionizing radiation releases electrons which are trapped in defects in the material's crystal structure. The electrons are released from the traps when stimulated with green visible light with a wavelength of approximately 520 nm and emit blue visible light with a wavelength of approximately 420 nm. This stimulated emission also returns some of the trapped electrons to the ground state. Under a specified stimulation regime (fixed stimulation, reading wavelength, fixed stimulation time and pulse shape) the intensity of the emitted light is proportional to the radiation exposure and is linear in the range from 0.01 mGy (1 mrem) to over 1 kGy (100 krem). Existing OSL technology could be modified to read the invented OSLM dosimeter.

A modified reader for use with the StorCard embodiment would require light stimulation and collection on the same side of the card, which is known in the art. The modified reader would optimize the optics for the credit card format and for ruggedness, low cost, and efficiency to allow strategic reader placement. It would also require a new interface to actuate the shutter on the citizen's dosimeter. One embodiment couples the OSL optics with the StorCard product called "StorPod" which actuates the StorCard for data reading. An example of the StorPod is described in U.S. patent application Ser. No. 10/384,385 filed by Conner et al. as well as the other Conner Patents and Patent Applications are incorporated by reference.

System (Card Reader, OSL Reader, Chip/UPC/Radio Reader, Database Etc.)

The OSLM (w/novel filters), dosimeter encasing (i.e. card), and OSL reader can be connected to a computer system (i.e. database) that tracks individual, regional and other data. The card reading centers can be connected to the computer system in a number of ways known in the art including but not limited to: direct network, cellular and other connections.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

The invention claimed is:

1. A dosimeter for measuring radiation dose radiation, comprising:
   at least two combined equilibrium and energy compensation (CEEC) filters;
   an optically stimulated luminescent material (OSLM) positioned between the at least two CEEC filters;
   wherein each of the at least two CEEC filters comprise: an electronic equilibrium filter layer having an inner and outer side and an energy compensation filter layer, wherein each of the energy compensation filter layers is positioned on the outer side of the each of equilibrium filters, wherein the electronic equilibrium filter comprises steel and wherein the energy compensation filter comprises Tantalum.

2. The dosimeter of claim 1, wherein the energy compensation filters and equilibrium filter layers are connected via one or more intervening layers forming a CEEC.

3. The dosimeter of claim 1, wherein energy compensation filter layers and equilibrium filter layers are connected to form the CEEC.

4. The dosimeter of claim 1, further comprising an upper encasing member and a lower encasing member, wherein the OSLM, equilibrium filters and energy compensation filters are positioned between the upper and lower encasing members forming an encased dosimeter.

5. The dosimeter of claim 4, wherein filters layers of each CEEC are connected via one or more intervening layers.

6. The dosimeter of claim 4, wherein the filter layers within each CEEC are connected.

7. The dosimeter of claim 4, wherein the energy compensation filter layers are between about 0.05-0.15 mm thick, the equilibrium filter layers are between about 0.05 and 0.15 mm thick and the encased dosimeter is between about 0.5 and 2.0 mm thick.

8. The dosimeter of claim 4, wherein the upper and lower encasing members are sealed together enclosing the OSLM and filters within a sealed encasing.

9. The dosimeter of claim 1, further comprising a shutter means for exposing at least one side of the OSLM where the shutter means is in the closed position during radiation measurement, and exposes the OSLM when the shutter means is open during readout.

10. The dosimeter of claim 1, wherein the energy compensation filter layers are between about 0.05-0.15 mm thick.

11. The dosimeter of claim 1, wherein the equilibrium filter layers are each between about 0.05 and 0.15 mm thick.

12. The dosimeter of claim 1, wherein the OSLM is carbon doped aluminum oxide.

13. The dosimeter of claim 1, wherein dosimeter is between about 0.5-2.0 mm thick.

14. The dosimeter of claim 1, wherein the energy compensation filter layers are between about 0.05-0.15 mm thick, the equilibrium filter layers are between about 0.05 and 0.15 mm thick and the dosimeter card is between about 0.5 and 2.0 mm thick.

15. A thin dosimeter for measuring radiation dose comprising:
an optically stimulated luminescent material (OSLM);
two electronic equilibrium filters each having an inner and outer side; and
two energy compensation filters,
wherein the OSLM is positioned between the inner sides of the two equilibrium filters during radiation measurement, wherein the each of the energy compensation filters is positioned on the outer side of the each of equilibrium filters, and;
wherein the electronic equilibrium filters comprise steel and wherein the energy compensation filters comprise Tantalum.

16. The dosimeter of claim 15, wherein the energy compensation filters are between about 0.05-0.15 mm thick, the equilibrium filters are between about 0.05 and 0.15 mm thick and the dosimeter card is between about 0.5 and 2.0 mm thick.

17. The dosimeter of claim 15, wherein the equilibrium and energy compensation filters are connected.

18. A dosimeter for measuring radiation dose, comprising:
an optically stimulated luminescent material (OSLM);
a combined equilibrium and energy compensation (CEEC) filter means for providing energy compensation and electronic equilibrium to the dosimeter;
wherein the CEEC filter comprises: an electronic equilibrium filter layer having an inner and outer side and an energy compensation filter layer, wherein each of the energy compensation filter layers is positioned on the outer side of the each of equilibrium filters, wherein the electronic equilibrium filter comprises steel and wherein the energy compensation filter comprises Tantalum, and wherein the at least one CEEC means is positioned between the source of radiation and the OSLM.

* * * * *

UNITED STATES PATENT AND TRADEMARK OFFICE
CERTIFICATE OF CORRECTION

| | | |
|---|---|---|
| PATENT NO. | : 7,781,747 B1 | Page 1 of 1 |
| APPLICATION NO. | : 12/201341 | |
| DATED | : August 24, 2010 | |
| INVENTOR(S) | : Gladys Klemic, Paul Bailey and Cecilia Breheny | |

It is certified that error appears in the above-identified patent and that said Letters Patent is hereby corrected as shown below:

On the Title Page, Item (54) and in the Specification, Column 1, lines 1-3

VERY THIN DOSIMETER FILTERS AND LOW PROFILE DOSIMETER ENCORPORATING THE SAME

Should be corrected to read:

VERY THIN DOSIMETER FILTERS AND LOW PROFILE DOSIMETER INCORPORATING THE SAME

Signed and Sealed this
Seventeenth Day of March, 2015

Michelle K. Lee
*Director of the United States Patent and Trademark Office*